United States Patent
Zheng et al.

(10) Patent No.: US 9,934,717 B2
(45) Date of Patent: Apr. 3, 2018

(54) SOURCE DRIVER AND DRIVING METHOD THEREOF, ARRAY SUBSTRATE AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Liangliang Zheng, Beijing (CN); Jian He, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 72 days.

(21) Appl. No.: 14/896,810

(22) PCT Filed: Jun. 19, 2015

(86) PCT No.: PCT/CN2015/081913
§ 371 (c)(1),
(2) Date: Dec. 8, 2015

(87) PCT Pub. No.: WO2016/095467
PCT Pub. Date: Jun. 23, 2016

(65) Prior Publication Data
US 2016/0343292 A1    Nov. 24, 2016

(30) Foreign Application Priority Data
Dec. 15, 2014  (CN) .......................... 2014 1 0778976

(51) Int. Cl.
*G09G 3/20* (2006.01)
*G09G 3/32* (2016.01)
*G06F 1/32* (2006.01)

(52) U.S. Cl.
CPC ......... *G09G 3/2096* (2013.01); *G06F 1/3265* (2013.01); *G09G 3/20* (2013.01);
(Continued)

(58) Field of Classification Search
None
See application file for complete search history.

(56) References Cited

U.S. PATENT DOCUMENTS
2003/0151581 A1  8/2003  Suyama et al.
2005/0219181 A1  10/2005  Matsuda
(Continued)

FOREIGN PATENT DOCUMENTS
CN  1453675 A  11/2003
CN  101059947 A  10/2007
(Continued)

OTHER PUBLICATIONS

Second Chinese Office Action dated Dec. 9, 2016; Appln. No. 201410778976.1.
(Continued)

*Primary Examiner* — Kenneth B Lee, Jr.
(74) *Attorney, Agent, or Firm* — Ladas & Parry LLP

(57) ABSTRACT

Provided are a source driver and a driving method thereof, an array substrate and a display apparatus. The source driver comprises a plurality of output channels, a plurality of output amplifiers corresponding to the plurality of output channels and a bias circuit configured to supply the output amplifiers with bias currents. The driving method comprises: acquiring resistance values of the output channels (101); and for each of the output channels, setting an amplitude of the bias current supplied to the output amplifier corresponding to the output channel from the bias circuit,
(Continued)

according to the resistance value of the respective output channel, so that the bias current of the output amplifier corresponding to the output channel with a larger resistance value being greater than or equal to the bias current of the output amplifier corresponding to the output channel with a smaller resistance value in amplitude (102). Amplitudes of bias currents in different output channels are adjusted locally/partly, so that a power consumption of the source driver is decreased under a normal condition for driving and displaying of a display panel and in turn a power consumption of the entire display apparatus is reduced.

13 Claims, 4 Drawing Sheets

(52) U.S. Cl.
CPC ....... *G09G 3/32* (2013.01); *G09G 2310/0272* (2013.01); *G09G 2310/0275* (2013.01); *G09G 2310/0291* (2013.01); *G09G 2330/021* (2013.01)

(56) References Cited

U.S. PATENT DOCUMENTS

2007/0247408 A1    10/2007   Nishimura et al.
2012/0105393 A1     5/2012   Tan et al.

FOREIGN PATENT DOCUMENTS

| | | |
|---|---|---|
| CN | 201725544 U | 1/2011 |
| CN | 102800281 A | 11/2012 |
| CN | 104392688 A | 3/2015 |

OTHER PUBLICATIONS

International Search Report and Written Opinion both dated Sep. 24, 2015; PCT/CN2015/081913.
First Chinese Office Action dated Jul. 12, 2016; Appln. No. 201410778976.1.

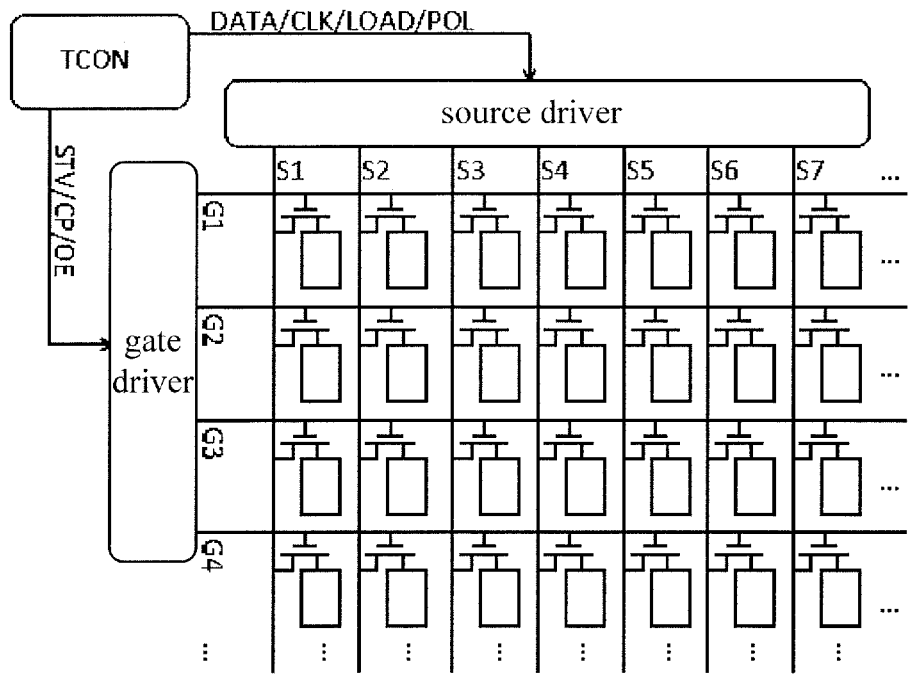

FIG. 5

| No. of output channel | control level of bias current value | Tcon Code | No. of output channel | control level of bias current value | Tcon Code |
|---|---|---|---|---|---|
| 1 | Maximum | 0x7 | m-7f(m/15) | Small | 0x1 |
| ⋮ | | | ⋮ | | |
| f(m/15)-1 | | | m-6f(m/15)-1 | | |
| f(m/15) | Middle Maximum | 0x6 | m-6f(m/15) | Middle Medium | 0x2 |
| ⋮ | | | ⋮ | | |
| 2f(m/15)-1 | | | m-5f(m/15)-1 | | |
| 2f(m/15) | Large | 0x5 | m-5f(m/15) | Medium | 0x3 |
| ⋮ | | | ⋮ | | |
| 3f(m/15)-1 | | | m-4f(m/15)-1 | | |
| 3f(m/15) | Middle Large | 0x4 | m-4f(m/15) | Middle Large | 0x4 |
| ⋮ | | | ⋮ | | |
| 4f(m/15)-1 | | | m-3f(m/15)-1 | | |
| 4f(m/15) | Medium | 0x3 | m-3f(m/15) | Large | 0x5 |
| ⋮ | | | ⋮ | | |
| 5f(m/15)-1 | | | m-2f(m/15)-1 | | |
| 5f(m/15) | Middle Medium | 0x2 | m-2f(m/15) | Middle Maximum | 0x6 |
| ⋮ | | | ⋮ | | |
| 6f(m/15)-1 | | | m-f(m/15)-1 | | |
| 6f(m/15) | Small | 0x1 | m-f(m/15) | Maximum | 0x7 |
| ⋮ | | | ⋮ | | |
| 7f(m/15)-1 | | | m | | |
| 7f(m/15) | Minimum | 0x0 | | | |
| ⋮ | | | | | |
| m-7f(m/15)-1 | | | | | |

FIG. 6

| No. of output channel | control level of bias current value | Tcon Code | No. of output channel | control level of bias current value | Tcon Code |
|---|---|---|---|---|---|
| 1 | Maximum | 0x7 | 1280 | Small | 0x1 |
| : | | | : | | |
| 159 | | | 1439 | | |
| 160 | Middle Maximum | 0x6 | 1440 | Middle Medium | 0x2 |
| : | | | : | | |
| 319 | | | 1599 | | |
| 320 | Large | 0x5 | 1600 | Medium | 0x3 |
| : | | | : | | |
| 479 | | | 1759 | | |
| 480 | Middle Large | 0x4 | 1760 | Middle Large | 0x4 |
| : | | | : | | |
| 639 | | | 1919 | | |
| 640 | Medium | 0x3 | 1920 | Large | 0x5 |
| : | | | : | | |
| 799 | | | 2079 | | |
| 800 | Middle Medium | 0x2 | 2080 | Middle Maximum | 0x6 |
| : | | | : | | |
| 959 | | | 2239 | | |
| 960 | Small | 0x1 | 2240 | Maximum | 0x7 |
| : | | | : | | |
| 1119 | | | 2400 | | |
| 1120 | Minimum | 0x0 | | | |
| : | | | | | |
| 1279 | | | | | |

FIG. 7

| No. of output channel | control level of bias current value | Tcon Code | No. of output channel | control level of bias current value | Tcon Code |
|---|---|---|---|---|---|
| 1 | Large | 0x5 | 1280 | Small | 0x1 |
| : | | | . | | |
| 159 | | | 1439 | | |
| 160 | | | 1440 | Middle Medium | 0x2 |
| : | | | : | | |
| 319 | | | 1599 | | |
| 320 | Middle Large | 0x4 | 1600 | Medium | 0x3 |
| : | | | : | | |
| 479 | | | 1759 | | |
| 480 | | | 1760 | Middle Large | 0x4 |
| : | | | : | | |
| 639 | | | 1919 | | |
| 640 | Medium | 0x3 | 1920 | | |
| : | | | : | | |
| 799 | | | 2079 | | |
| 800 | Middle Medium | 0x2 | 2080 | Large | 0x5 |
| : | | | . | | |
| 959 | | | 2239 | | |
| 960 | Small | 0x1 | 2240 | | |
| : | | | . | | |
| 1119 | | | 2400 | | |
| 1120 | | | | | |
| : | | | | | |
| 1279 | | | | | |

FIG. 8

SOURCE DRIVER AND DRIVING METHOD THEREOF, ARRAY SUBSTRATE AND DISPLAY APPARATUS

TECHNICAL FIELD

The present disclosure relates to a source driver and a driving method thereof, an array substrate and a display apparatus.

BACKGROUND

With the gradual increasing of panel resolution, the number of output channels of a source driver is increasing rapidly, for example, the number of the output channels(CH) of a single chip integrated source driver increases to 2400 CH, or even 3600 CH from a previous 1800 CH. If a previous production process is to be maintained, that is a line width and a line interval of the source output channel in a Fan-out region of the source driver to be unchanged, it will inevitably lead to an increasing of the Fan-out region and cause a bottom frame of a display panel to be wider, which is inconsistent with the market demand for a narrow frame.

Therefore, in order to meet market demands, designers of the display panel must reduce the line width and line interval of the source output channel, which will inevitably lead to an increasing of a wiring resistance of the source output channel (equivalent to a case that a resistance of a conductive wire of a specified material becomes greater as a cross-sectional area of the conductive wire becomes smaller). In that case, a difference between the resistances of the output channels at the middle and the edge of source driver may be great, for example, the resistance of the middle channel in the Fan-out area is only 200Ω, while the resistance of the edge channel in the Fan-out area may be up to 2000Ω (mainly because the fan-out wiring of the edge channel is longer in length than that of the middle channel).

However, in order to solve a problem of differences among phase delays in the source output signals of the respective channels caused by the great differences in the above resistances, usually, a bias current of the entire source driver is set according to the signal phase delays at the edge channels, such that the bias current may drive the source output signals at the edge channels normally but an overdriving phenomenon exists in the source output signals at the middle channels. That is, although the middle channel does not require the bias current with a large amplitude, but it also has to be driven by a bias current which may exceed the required amplitude in order to guarantee the normal driving of the edge channel, therefore it results in an unnecessary increasing in the power consumption of the source driver, which in turn causes a significant increasing in the power consumption of the display panel.

SUMMARY

At least one of embodiments of the present disclosure provides a source driver and a driving method thereof, an array substrate and a display apparatus. Amplitudes of bias currents in different output channels can be adjusted locally/partly, so that a power consumption of the source driver can be decreased under a normal condition for driving and displaying of a display panel and in turn a power consumption of the entire display apparatus can be reduced.

In a first aspect, at least one of the embodiments of the present disclosure provides a driving method of a source driver comprising a plurality of output channels, a plurality of output amplifiers corresponding to the plurality of output channels and a bias circuit configured to supply the output amplifiers with bias currents, wherein the driving method comprises:

acquiring resistance values of the output channels; and for each of the output channels, setting an amplitude of the bias current supplied to the output amplifier corresponding to the output channel from the bias circuit, according to the resistance value of the respective output channel, so that the bias current of the output amplifier corresponding to the output channel with a larger resistance value being greater than or equal to the bias current of the output amplifier corresponding to the output channel with a smaller resistance value in amplitude.

For example, the amplitudes of the bias currents supplied to the output amplifiers from the bias circuit are set by setting the resistance values of a plurality of bias resistors corresponding to the plurality of output amplifiers in the bias circuit.

For example, the for each of the output channels, setting an amplitude of the bias current supplied to the output amplifier corresponding to the output channel from the bias circuit, according to the resistance value of the respective output channel, so that the bias current of the output amplifier corresponding to the output channel with a larger resistance value being greater than or equal to the bias current of the output amplifier corresponding to the output channel with a smaller resistance value in amplitude comprises:

dividing the plurality of output channels wired in a fan-out manner into at least three sectors;

setting the bias circuit to supply the output amplifiers corresponding to the output channels in the same sector with bias currents having the same amplitude, and bias currents corresponding to sectors far away from an axis of a fan being greater than or equal to bias currents corresponding to sectors close to the axis of the fan in amplitude.

For example, the dividing the plurality of output channels wired in a fan-out manner into at least three sectors comprises:

dividing the plurality of output channels wired in the fan-out manner into at least three equal sectors whose total number is an odd number according to distances to the axis of the fan.

In a second aspect, at least one of the embodiments of the present disclosure further provides a source driver comprising a plurality of output channels, a plurality of output amplifiers corresponding to the plurality of output channels and a bias circuit configured to supply the output amplifiers with bias currents, wherein the source driver further comprises:

a channel resistance acquirement module configured to acquire resistance values of the output channels; and a bias current setting module configured to, for each of the output channels, set an amplitude of the bias current supplied to the output amplifier corresponding to the output channel from the bias circuit, according to the resistance value of the respective output channel acquired by the channel resistance acquirement module, so that the bias current of the output amplifier corresponding to the output channel with a larger resistance value is greater than or equal to the bias current of the output amplifier corresponding to the output channel with a smaller resistance value in amplitude.

For example, the bias circuit comprises a plurality of bias resistors corresponding to the plurality of output amplifiers, and the bias current setting module comprises a bias resistance setting unit configured to set the amplitudes of the bias currents supplied to the output amplifiers from the bias circuit by setting the resistance values of a plurality of bias resistors corresponding to the plurality of output amplifiers in the bias circuit.

For example, if the plurality of output channels are wired in a fan-out manner, the bias current setting module further comprises:

a sector division unit configured to divide the plurality of output channels wired in the fan-out manner into at least three sectors; and a sector bias current setting unit configured to set the bias circuit to supply the output amplifiers corresponding to the output channels in the same sector with bias currents having the same amplitude, and bias currents corresponding to sectors far away from an axis of a fan to be greater than or equal to bias currents corresponding to sectors close to the axis of the fan in amplitude.

For example, the sector division unit is further configured to divide the plurality of output channels wired in the fan-out manner into at least three equal sectors whose total number is an odd number according to distances to the axis of the fan.

In a third aspect, at least one of the embodiments of the present disclosure further provides an array substrate comprising any one of the source drivers described above.

In a fourth aspect, at least one of the embodiments of the present disclosure further provides a display apparatus comprising any one of the array substrates described above.

With the above solutions, the bias current control module in the source driver according to the present disclosure can control the bias current values corresponding to the respective output amplifiers, which realizes the setting of the bias current values for the respective channels. On this basis, the method for reducing the power consumption of the source driver according to the present disclosure can set the different bias current values depending on the resistance values of the output channels, therefore suitable output pushes for the respective amplifiers can be set depending on actual requirements of the respective output channels, so that the power consumptions of the source driver, the array substrate and the display apparatus can be reduced while their normal operations are not affected.

Of course, any one of products or methods implementing the present disclosure does not need to achieve all of the advantages described above at the same time.

BRIEF DESCRIPTION OF THE DRAWINGS

FIG. 5 illustrates a structure of a separate driving circuit in a traditional array substrate;

FIG. 6 is an exemplary diagram illustrating a detailed manner for setting the bias currents according to one embodiment of the present disclosure;

FIG. 7 is an exemplary diagram illustrating a detailed manner for setting the bias currents according to one embodiment of the present disclosure; and FIG. 8 is an exemplary diagram illustrating a detailed manner for setting the bias currents according to one embodiment of the present disclosure.

DETAILED DESCRIPTION

Thereafter, in order to make the objectives, technical solutions and advantages of the embodiments of the present disclosure become more apparent, solutions of embodiments of the present disclosure will be described clearly and completely in connection with drawings of the embodiments of the present disclosure, but obviously the described embodiments are only some, but not all of the embodiments of the present disclosure. Any other embodiments obtained by those ordinary skilled in the art based on the embodiments of the present disclosure without inventive labors should fall into a scope sought for protection in the present disclosure.

Figure 1:
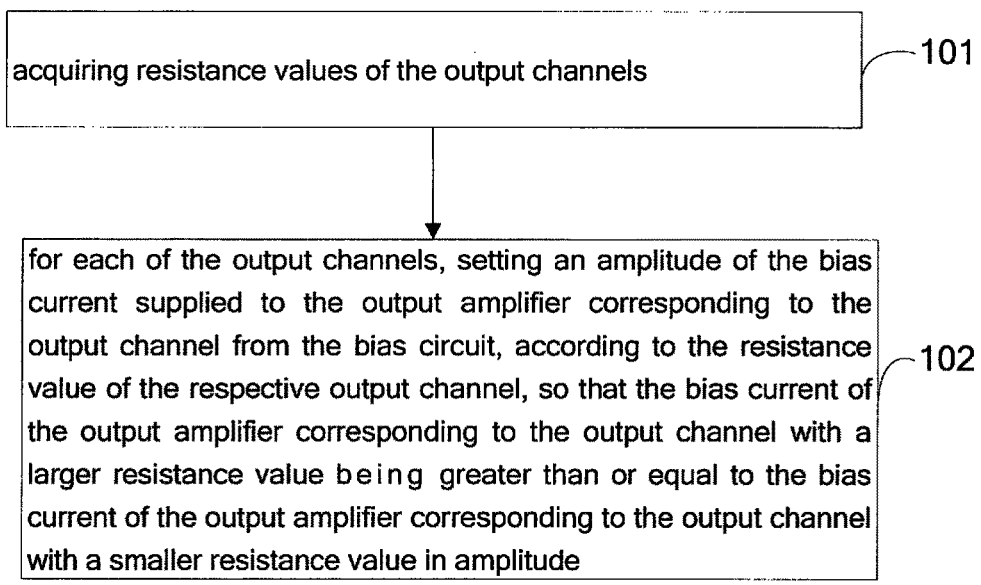
FIG. 1 is a flowchart view illustrating a method for reducing a power consumption of a source driver according to one embodiment of the present disclosure.

FIG. 1 is a flowchart view illustrating a method for reducing a power consumption of a source driver according to one embodiment of the present disclosure. Wherein the source driver comprises a plurality of output channels, a plurality of output amplifiers corresponding to the plurality of output channels and a bias circuit configured to supply the output amplifiers with bias currents. Referring to FIG. 1, the method comprises:

at step 101, resistance values of the output channels are acquired; and at step 102, for each of the output channels, an amplitude of the bias current supplied to the output amplifier corresponding to the output channel from the bias circuit is set, according to the resistance value of the respective output channel, so that the bias current of the output amplifier corresponding to the output channel with a larger resistance value is greater than or equal to the bias current of the output amplifier corresponding to the output channel with a smaller resistance value in amplitude.

In order to describe solutions of the embodiments of the present disclosure more clearly, influences of the output channels as well as the resistance values of the output channels will be discussed below. As mentioned in the portion of BACKGROUND previously, in order to apply an existing source driver with multi-output-channels (such as the 1200 CH, 2400 CH and 3600 CH described above) to a display apparatus with a thin frame, a line width and a line interval of the output channel must be decreased, such that a wiring for the output channels becomes thin and concentrated, that is, a cross sectional area S of a conductive line is reduced, and based on a formula as follow:

$$R = \rho \frac{L}{S},$$

(wherein $\rho$ is a material resistance ratio, L is a length of the conductive line), it can be seen that the resistance value R of the output channel would necessarily increase as its cross sectional area S decreases. Further, differences among the resistance values of the output channels with the different lengths L may also increase. For example, assuming that a length $L_A$ of an output channel CHA is 10 times of a length $L_B$ of an output channel CHB, their resistance values are $R_A=20\Omega$ and $R_B=2\Omega$ respectively, a difference therebetween is 18Ω. After the cross sectional areas of these two output channels are both reduced to one percent of their original values, the resistance value of the output channel CHA is $R_A=2000Ω$, and the resistance value of the output channel CHB is $R_B=200Ω$, the difference therebetween is 1800Ω. Therefore, a traditional display technique, which usually considers the resistances of the output channels are all small and the differences among the resistance values can be ignored, may not be always suitable for the source driver whose output channels have the small line widths and small line intervals. As the resistance values of the output channels and the resistance differences among the channels increase, there is a large difference on phase delays among the source output signals output from the different output channels, such that a problem of over-driving of the bias currents would occur in a part of the output channels, just as mentioned in the portion of BACKGROUND.

Figure 2:
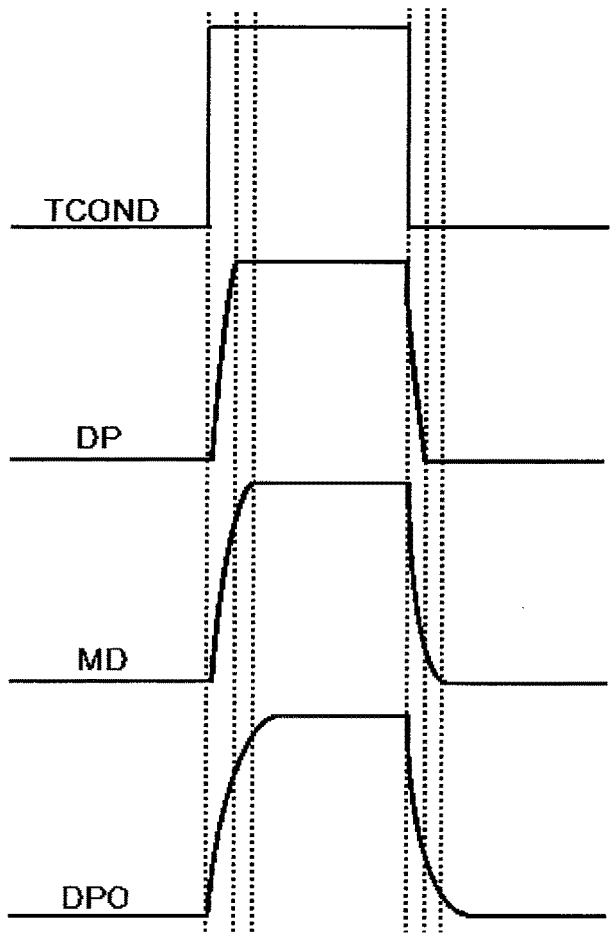
FIG. 2 is an exemplary view illustrating signal phase delay cases caused by differences among resistances values of output channels in one embodiment of the present disclosure.

For example, because the source output signal is generally a constant voltage output, but a raise time and a drop time of the source output signal would increase as the bias current decreases, that is, the source output signal may have a larger phase delay than an input signal. Under a condition that the bias current is unchanged, a magnitude of this phase delay is decided by a product of the resistance and a capacitance of the output channel. In particular, a phase delay case of the signal caused by the difference among the resistance values is shown in FIG. 2. FIG. 2 is an exemplary view illustrating signal phase delay cases caused by differences among resistances values of output channels in one embodiment of the present disclosure. In this case, the resistance values of output channels the corresponding to the source output signals DP, MD, DPO respectively increase sequentially. It can be seen that, as compared with a data signal TCOND input to the respective output channels from a Timer Control Register (TCON), the signal phase delay of the output channel having the larger resistance value is greater. In view of this, a traditional design generally set a larger bias current for the source driver in order to ensure that the phase delays of the source output signals of all output channels are smaller than a certain level, such that a part of the output channels having the smaller resistance values are in the over-driving state, which increases additional power consumption.

In order to settle the above problem, the method according to the embodiments of the present disclosure sets different bias currents according to the resistance values of the output channels, so that the output amplifiers corresponding to the different output channels locate at different static operating points, that is to say, the smaller bias current is applied to the output channel having the smaller resistance value while the greater bias current is applied to the output channel having the greater resistance value, so that the above over-driving phenomenon is avoided without affecting the normal driving, and in turn an object of decreasing of the power consumption of the source driver is achieved.

Figure 3:
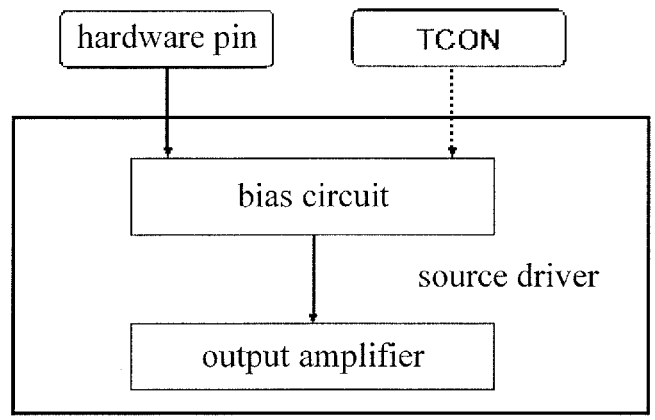
FIG. 3 is a principle view for setting bias currents according to one embodiment of the present disclosure.

For example, in the above step 102, the amplitudes of the bias currents supplied to the output amplifiers from the bias circuit are set by setting the resistance values of a plurality of bias resistors corresponding to the plurality of output amplifiers in the bias circuit. FIG. 3 is a principle view for setting bias currents in the driving method described above. Referring to FIG. 3, for the different output amplifiers, different bias circuits may be set respectively and connected to different bias current hardware configuration resistors as their corresponding bias resistors via a plurality of preset hardware pins, in order to realize the setting of the bias currents. Alternatively, the above bias circuits may receive TCON codes from the TCON and supply the bias currents having corresponding amplitudes to the respective output amplifiers, that is to say, the TCON is utilized to control the bias circuit in order to realize the setting of the bias currents. Detailed implementation apparatus and methods of these two methods are known solutions, so details would not be repeated herein.

Figure 4:
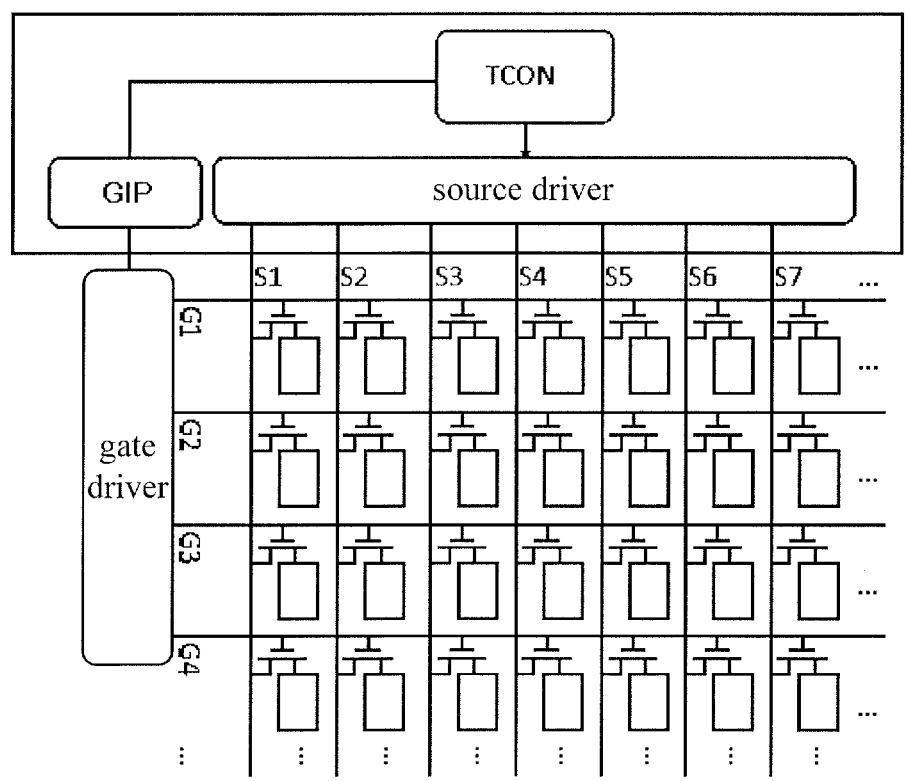
FIG. 4 illustrates a structure of a driving circuit of an array substrate according to one embodiment of the present disclosure.

FIG. 4 illustrates a structure of a driving circuit of an array substrate according to one embodiment of the present disclosure. FIG. 5 illustrates a structure of a separate driving circuit in a traditional array substrate. As implementing the above driving method with the TCON described above, the array substrate may utilize a 1-Chip GOA (one chip gate shift register integrated on substrate) structure shown in FIG. 4. As compared with the traditional separate driving structure shown in FIG. 5 (in drawings, S1 to S7 denote column numbers and G1 to G4 denote row numbers, the TCON, which outputs the data voltage signal DATA, a start pulse signal LOAD, a polarity control signal POL and a clock signal CLK to the source driver, is designed as being at the same chip with the source driver, and the TCON outputs a scan start signal STV, a gate selection signal CP and an output enable signal OE to a gate driver through a Gate In panel (GIP) circuit. With this structure, the driving method described above may set the different bias currents for the output resistors in the different columns by the TCON code, which achieves a perfect effect in decreasing of the power consumption.

For example, the step 102 may comprise steps as follows (not shown in FIG. 1)

step 1021: dividing the plurality of output channels wired in a fan-out manner into at least three sectors;

step 1022: setting the bias circuit to supply the output amplifiers corresponding to the output channels in the same sector with bias currents having the same amplitude, and bias currents corresponding to sectors far away from an axis of a fan being greater than or equal to bias currents corresponding to sectors close to the axis of the fan in amplitude.

For example, the step 1021 may comprises: dividing the plurality of output channels wired in the fan-out manner into at least three equal sectors whose total number is an odd number according to distances to the axis of the fan.

Under these two conditions, FIG. 6 is an exemplary diagram illustrating a detailed manner for setting the bias currents corresponding to the respective output channels. Wherein, it is assumed that a total number of the output channels of the source driver is m and these output channels are wired in the fan-out manner (a wiring length of the middle channel is short and its resistance value is small). Further, for a purpose of simple description, a function f(x/y) is defined to represent dividing x by y and then remaining the numbers to the tens place while setting the ones place as zero without any rounding, for example, f(3200/15)=210. Referring to FIG. 6, the detailed manner for setting comprises a process as follows.

By testing, the corresponding bias currents of the output amplifiers in the source driver corresponding to the first to the (f(m/15)-1)th output channels and the (m-f(m/15))th to the mth output channels of the source driver are set as maximum, namely 0×7.

The corresponding bias currents of the output amplifiers in the source driver corresponding to the (f(m/15))th to the (2f(m/15)-1)th output channels and the (m-2f(m/15))th to the (m-f(m/15)-1)th output channels are set as middle maximum, namely 0×6.

The corresponding bias currents of the output amplifiers in the source driver corresponding to the (2f(m/15))th to the (3f(m/15)-1)th output channels and the (m-3f(m/15))th to the (m-2f(m/15)-1)th output channels are set as large, namely 0×5.

The corresponding bias currents of the output amplifiers in the source driver corresponding to the (3f(m/15))th to the (4f(m/15)-1)th output channels and the (m-4f(m/15))th to the (m-3f(m/15)-1)th output channels are set as middle large, namely 0×4.

The corresponding bias currents of the output amplifiers in the source driver corresponding to the (4f(m/15))th to the (5f(m/15)-1)th output channels and the (m-5f(m/15))th to the (m-4f(m/15)-1)th output channels are set as medium, namely 0×3.

The corresponding bias currents of the output amplifiers in the source driver corresponding to the (5f(m/15))th to the (6f(m/15)-1)th output channels and the (m-6f(m/15))th to the (m-5f(m/15)-1)th output channels are set as middle medium, namely 0×2.

The corresponding bias currents of the output amplifiers in the source driver corresponding to the (6f(m/15))th to the (7f(m/15)-1)th output channels and the (m-7f(m/15))th to the (m-6f(m/15)-1)th output channels are set as small, namely 0×1.

The corresponding bias currents of the output amplifiers in the source driver corresponding to the (7f(m/15))th to the (m-7f(m/15)-1)th output channels are set as minimum, namely 0×0.

FIGS. 7-8 are exemplary diagrams illustrating two detailed manners for setting the bias currents according to embodiments of the present disclosure. For example, the detailed setting manner as m=2400 may refer to FIG. 7. Of course, there may be other setting manners for control levels of the bias current values of the output channels in different areas. For example, the setting manner shown in FIG. 8 is obtained by, based on the setting manner shown in FIG. 6, combining the two sectors whose Tcon code are 0×6 and 0×7 into one sector whose Tcon code is 0×5, combining the two sectors whose Tcon code are 0×5 and 0×4 into one sector whose Tcon code is 0×4 and combining the two sectors whose Tcon code are 0×1 and 0×0 into one sector whose Tcon code is 0×1.

Based on the same inventive concept, the present disclosure further provides a source driver comprising a plurality of output channels, a plurality of output amplifiers corresponding to the plurality of output channels and a bias circuit configured to supply the output amplifiers with bias currents. The source driver further comprises:

a channel resistance acquirement module configured to acquire resistance values of the output channels; and a bias current setting module configured to, for each of the output channels, set an amplitude of the bias current supplied to the output amplifier corresponding to the output channel from the bias circuit, according to the resistance value of the respective output channel acquired by the channel resistance acquirement module, so that the bias current of the output amplifier corresponding to the output channel with a larger resistance value is greater than or equal to the bias current of the output amplifier corresponding to the output channel with a smaller resistance value in amplitude.

It should be noted that the channel resistance acquirement module and/or the bias current setting module may be embodied by actual circuits or computer program. In one embodiment of the present disclosure, the channel resistance acquirement module may comprise a resistance sensor circuit configured to acquire resistance value of each output channel, and the bias current setting module may comprise a logic calculation circuit configured to calculate the TCON code corresponding to the respective output channels according to resistance values. In another embodiment of the present disclosure, the channel resistance acquirement module may be a module in a manner of computer program capable of calculating the resistance of each output channel according to circuit design parameter(s) stored in files, and the bias current setting module may be a module in a manner of computer program capable of calculating actual setting parameter(s) for the bias currents corresponding to the respective output channels according to the resistance values, and in this case, these two modules are not required to be integrated in the actual circuit of the source driver and may be existed in an external computer device or a storage medium separately.

For example, the bias circuit comprises a plurality of bias resistors corresponding to the plurality of output amplifiers, and the bias current setting module comprises a bias resistance setting unit configured to set the amplitudes of the bias currents supplied to the output amplifiers from the bias circuit by setting the resistance values of a plurality of bias resistors corresponding to the plurality of output amplifiers in the bias circuit.

For example, if the plurality of output channels are wired in a fan-out manner, the bias current setting module further comprises:

a sector division unit configured to divide the plurality of output channels wired in the fan-out manner into at least three sectors; and a sector bias current setting unit configured to set the bias circuit to supply the output amplifiers corresponding to the output channels in the same sector with bias currents having the same amplitude, and bias currents corresponding to sectors far away from an axis of a fan to be greater than or equal to bias currents corresponding to sectors close to the axis of the fan in amplitude.

For example, the sector division unit is further configured to divide the plurality of output channels wired in the fan-out manner into at least three equal sectors whose total number is an odd number according to distances to the axis of the fan.

The source driver can implement any one of the driving methods for the source driver described above and has the same technical features, therefore it can settle the same technical problem and achieve the same technical effect.

Based on the same inventive concept, the present disclosure further provides an array substrate comprising any one of the source drivers described above. The array substrate has the same technical features as the any one of the source drivers described above, therefore it can settle the same technical problem and achieve the same technical effect.

Based on the same inventive concept, the present disclosure further provides a display apparatus comprising any one of the array substrates described above. The display apparatus may be: a liquid crystal display panel, a piece of electrical paper, a mobile phone, a tablet computer, a TV, a notebook computer, a digital frame, a navigator and any other products or parts having the display function. The display apparatus has the same technical features as the any one of the array substrates described above, therefore it can settle the same technical problem and achieve the same technical effect.

It should be noted that, as used in the present disclosure, the direction or position relationship indicated by the terms "up", "down", etc., are the direction or position relationship shown in drawings, which is only used to facilitate the description of the present disclosure and simplify the description, rather than indicate or suggest that a device or element must have a specific orientation, be configured or operate in the specific orientation, therefore it can not be constructed as any limitations on the present disclosure. Unless otherwise specified, the term "installation", "connected", "connection" should be understand broadly and generally, for example, it may be a fixed connection, a detachable connection, or a integrated connection, may be a mechanical connection or an electrical connection; may be connected directly or connected indirectly via intervening elements; or also may be an internal connection between two components. For those ordinary skilled in the art, the specific meaning of the above terms in the present disclosure may be understood based on their specific situations.

It should be noted that, as used herein, the relationship terms, such as first, second, etc., are only used to distinguish one entity or operation from another, rather than requiring or suggesting any actual relationship or sequence among these entities or operations. The term "include", "comprise" or any other variety is intended to cover non exclusive inclusion, thereby the process, method, object or device including/comprising a series of elements includes/comprises not only those elements, but also other elements that are not explicitly listed, or also includes/comprises elements inherent for the process, method, object or equipment. In cases where there is no more restriction, the element defined by a statement "includes/comprises one . . . " does not preclude other similar elements existed in the process, method, object or equipment.

It may understand that above embodiments are only for explaining the solutions of the present disclosure; however, the present disclosure is not limited thereto. Although the present disclosure is described in detail with reference to the above embodiments, it should be understood by those ordinary skilled in the art that modifications can be made to the solutions recited in the above embodiments, or that equivalent alternatives can be made to part of the technical features. These modifications and equivalent alternatives do not cause the essence of corresponding solutions to depart from the spirit and scope of the solutions of the embodiments of the present disclosure.

The present application claims the priority of Chinese Patent Application No. 201410778976.1 filed on Dec. 15, 2014, which as a whole is incorporated herewith as part of the present invention by reference.

What is claimed is:

1. A driving method of a source driver comprising a plurality of output channels, a plurality of output amplifiers corresponding to the plurality of output channels and a bias circuit configured to supply the output amplifiers with bias currents, wherein the driving method comprises:
   acquiring a resistance value of each of the output channels; and
   for each of the output channels, setting an amplitude of the bias current supplied to the output amplifier corresponding to the output channel from the bias circuit, according to the resistance value of the respective output channel, so that the bias current of the output amplifier corresponding to the output channel with a larger resistance value being greater than or equal to the bias current of the output amplifier corresponding to the output channel with a smaller resistance value in amplitude,
   dividing the plurality of output channels wired in a fan-out manner into at least three sectors;
   setting the bias circuit to supply the output amplifiers corresponding to the output channels in the same sector with bias currents having the same amplitude, and bias currents corresponding to sectors far away from an axis of a fan being greater than or equal to bias currents corresponding to sectors close to the axis of the fan in amplitude.

2. The method of claim 1, wherein the amplitudes of the bias currents supplied to the output amplifiers from the bias circuit are set by setting the resistance values of a plurality of bias resistors corresponding to the plurality of output amplifiers in the bias circuit.

3. The method of claim 1, wherein the dividing the plurality of output channels wired in a fan-out manner into at least three sectors comprises:
   dividing the plurality of output channels wired in the fan-out manner into at least three equal sectors whose total number is an odd number according to distances to the axis of the fan.

4. A source driver comprising a plurality of output channels, a plurality of output amplifiers corresponding to the plurality of output channels and a bias circuit configured to supply the output amplifiers with bias currents, wherein the source driver further comprises:
   a channel resistance acquirement module configured to acquire a resistance value of each of the output channels; and
   a bias current setting module configured to, for each of the output channels, set an amplitude of the bias current supplied to the output amplifier corresponding to the output channel from the bias circuit, according to the resistance value of the respective output channel acquired by the channel resistance acquirement module, so that the bias current of the output amplifier corresponding to the output channel with a larger resistance value is greater than or equal to the bias current of the output amplifier corresponding to the output channel with a smaller resistance value in amplitude,
   wherein if the plurality of output channels are wired in a fan-out manner, the bias current setting module further comprises:
   a sector division unit configured to divide the plurality of output channels wired in the fan-out manner into at least three sectors; and
   a sector bias current setting unit configured to set the bias circuit to supply the output amplifiers corresponding to the output channels in the same sector with the bias currents having the same amplitude, and bias currents corresponding to sectors far away from an axis of a fan to be greater than or equal to bias currents corresponding to sectors close to the axis of the fan in amplitude.

5. The source driver of claim 4, wherein the bias circuit comprises a plurality of bias resistors corresponding to the plurality of output amplifiers, and the bias current setting module comprises a bias resistance setting unit configured to set the amplitudes of the bias currents supplied to the output amplifiers from the bias circuit by setting the resistance values of a plurality of bias resistors corresponding to the plurality of output amplifiers in the bias circuit.

6. The source driver of claim 5, wherein the sector division unit is further configured to divide the plurality of output channels wired in the fan-out manner into at least three equal sectors whose total number is an odd number according to distances to the axis of the fan.

7. An array substrate comprising the source driver of claim 4.

8. A display apparatus comprising the array substrate of claim 7.

9. The method of claim 2, wherein the dividing the plurality of output channels wired in a fan-out manner into at least three sectors comprises:

dividing the plurality of output channels wired in the fan-out manner into at least three equal sectors whose total number is an odd number according to distances to the axis of the fan.

10. The source driver of claim 5, wherein the sector division unit is further configured to divide the plurality of output channels wired in the fan-out manner into at least three equal sectors whose total number is an odd number according to distances to the axis of the fan.

11. The array substrate of claim 7, wherein the bias circuit comprises a plurality of bias resistors corresponding to the plurality of output amplifiers, and the bias current setting module comprises a bias resistance setting unit configured to set the amplitudes of the bias currents supplied to the output amplifiers from the bias circuit by setting the resistance values of a plurality of bias resistors corresponding to the plurality of output amplifiers in the bias circuit.

12. The array substrate of claim 7, wherein the sector division unit is further configured to divide the plurality of output channels wired in the fan-out manner into at least three equal sectors whose total number is an odd number according to distances to the axis of the fan.

13. The display apparatus of claim 8, wherein the bias circuit comprises a plurality of bias resistors corresponding to the plurality of output amplifiers, and the bias current setting module comprises a bias resistance setting unit configured to set the amplitudes of the bias currents supplied to the output amplifiers from the bias circuit by setting the resistance values of a plurality of bias resistors corresponding to the plurality of output amplifiers in the bias circuit.

\* \* \* \* \*